(12) United States Patent
Koller

(10) Patent No.: US 8,991,778 B2
(45) Date of Patent: Mar. 31, 2015

(54) VEHICLE SEAT ANCHORAGES

(71) Applicant: Koller Engineering Limited, Yeovil, Somerset (GB)

(72) Inventor: Max Arnold Koller, Somerset (GB)

(73) Assignee: Koller Engineering Limited, Somerset (GB)

(*) Notice: Subject to any disclaimer, the term of this patent is extended or adjusted under 35 U.S.C. 154(b) by 179 days.

(21) Appl. No.: 13/893,687

(22) Filed: May 14, 2013

(65) Prior Publication Data
US 2013/0306827 A1 Nov. 21, 2013

(30) Foreign Application Priority Data

May 15, 2012 (GB) .................................. 1208222.8

(51) Int. Cl.
*A47B 97/00* (2006.01)
*B60N 2/005* (2006.01)
*B60N 2/015* (2006.01)

(52) U.S. Cl.
CPC ............ *B60N 2/005* (2013.01); *B60N 2/01525* (2013.01); *B60N 2/01541* (2013.01); *B60N 2/01575* (2013.01)
USPC ...... 248/503.1; 248/429; 248/503; 296/65.13

(58) Field of Classification Search
CPC ........... B60N 2/01575; B60N 2/01541; B60N 2/005; B60N 2/0715; B60N 2/0825; B60N 2/01525; B60N 2/0155; B60N 2/015; B60N 2/01508; B60N 2/01516; B64D 11/0696

USPC ...................... 248/429, 503, 503.1; 296/65.13
See application file for complete search history.

(56) References Cited

U.S. PATENT DOCUMENTS

| 4,913,489 | A | * | 4/1990 | Martin | 297/232 |
| 5,937,706 | A | * | 8/1999 | Sawdy | 74/531 |
| 6,299,120 | B1 | * | 10/2001 | Girardi et al. | 248/429 |
| 7,410,127 | B1 | * | 8/2008 | Ahad | 244/118.5 |
| 7,618,009 | B2 | * | 11/2009 | Glockler | 244/118.1 |
| 8,371,781 | B2 | * | 2/2013 | Roy et al. | 410/105 |
| 8,528,860 | B2 | * | 9/2013 | Vanderwolk | 244/118.5 |
| 8,602,702 | B2 | * | 12/2013 | Roy et al. | 410/105 |
| 2009/0302665 | A1 | * | 12/2009 | Dowty | 297/463.1 |
| 2010/0001546 | A1 | * | 1/2010 | Christensen | 296/65.13 |

FOREIGN PATENT DOCUMENTS

EP  1 407 920 A2  4/2004

* cited by examiner

*Primary Examiner* — Anita M King
(74) *Attorney, Agent, or Firm* — Ware, Fressola, Maguire & Barber LLP

(57) ABSTRACT

A vehicle seat anchorage (22) assembly employs a cam (34) mounted in an anchorage member (24) for rotation about an axis transverse of the anchorage member between: an unlocked position (FIG. 17A) in which the cam allows a pair of locking members (70 and 72) to assume their unlocked positions, and a locked position (FIG. 17B) in which the cam pushes down on inner portions (82) of the locking members so that outer portions (84) of the locking members assume their locked positions engaging under lips (12) of an anchorage rail (10).

10 Claims, 3 Drawing Sheets

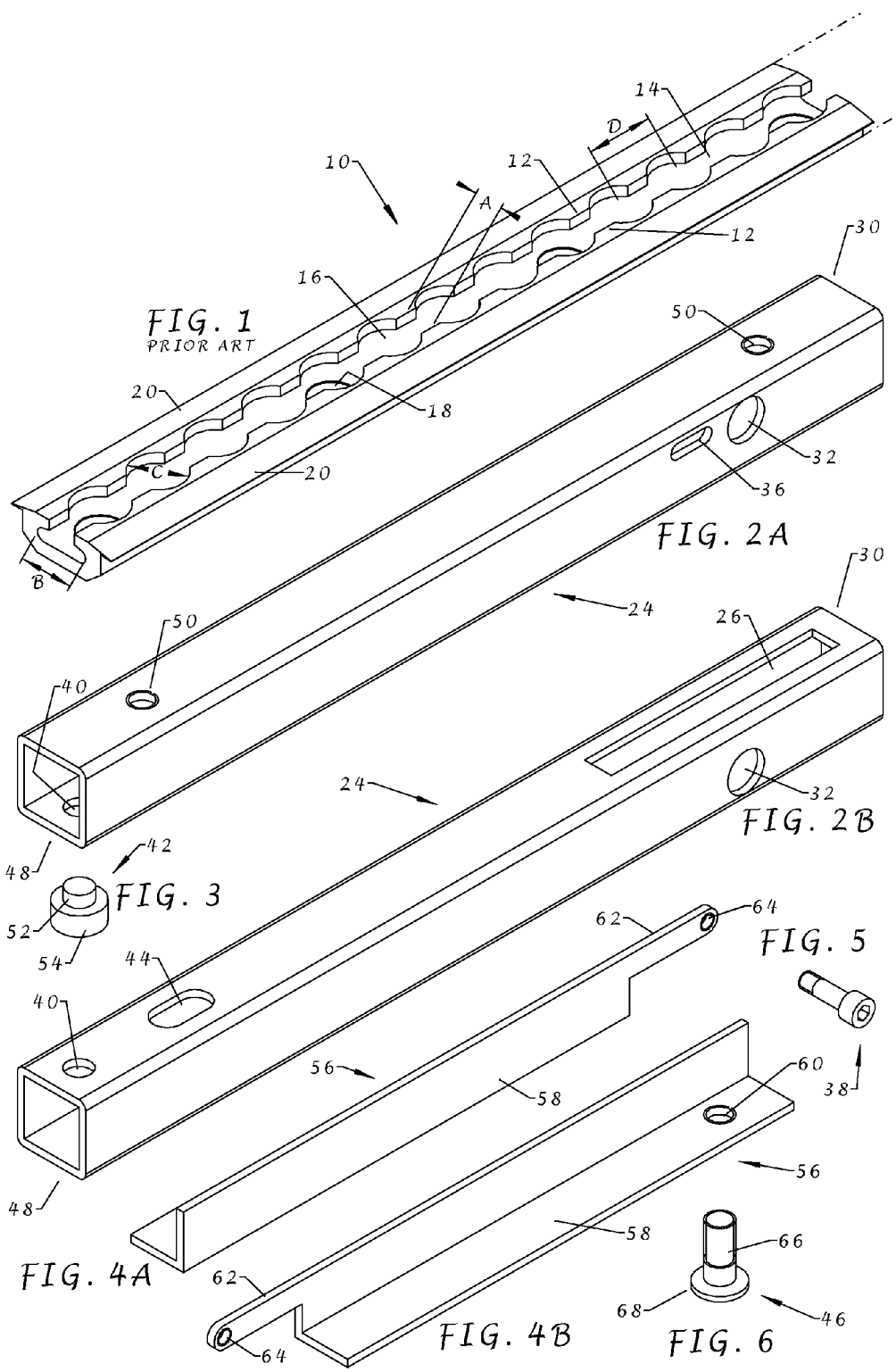

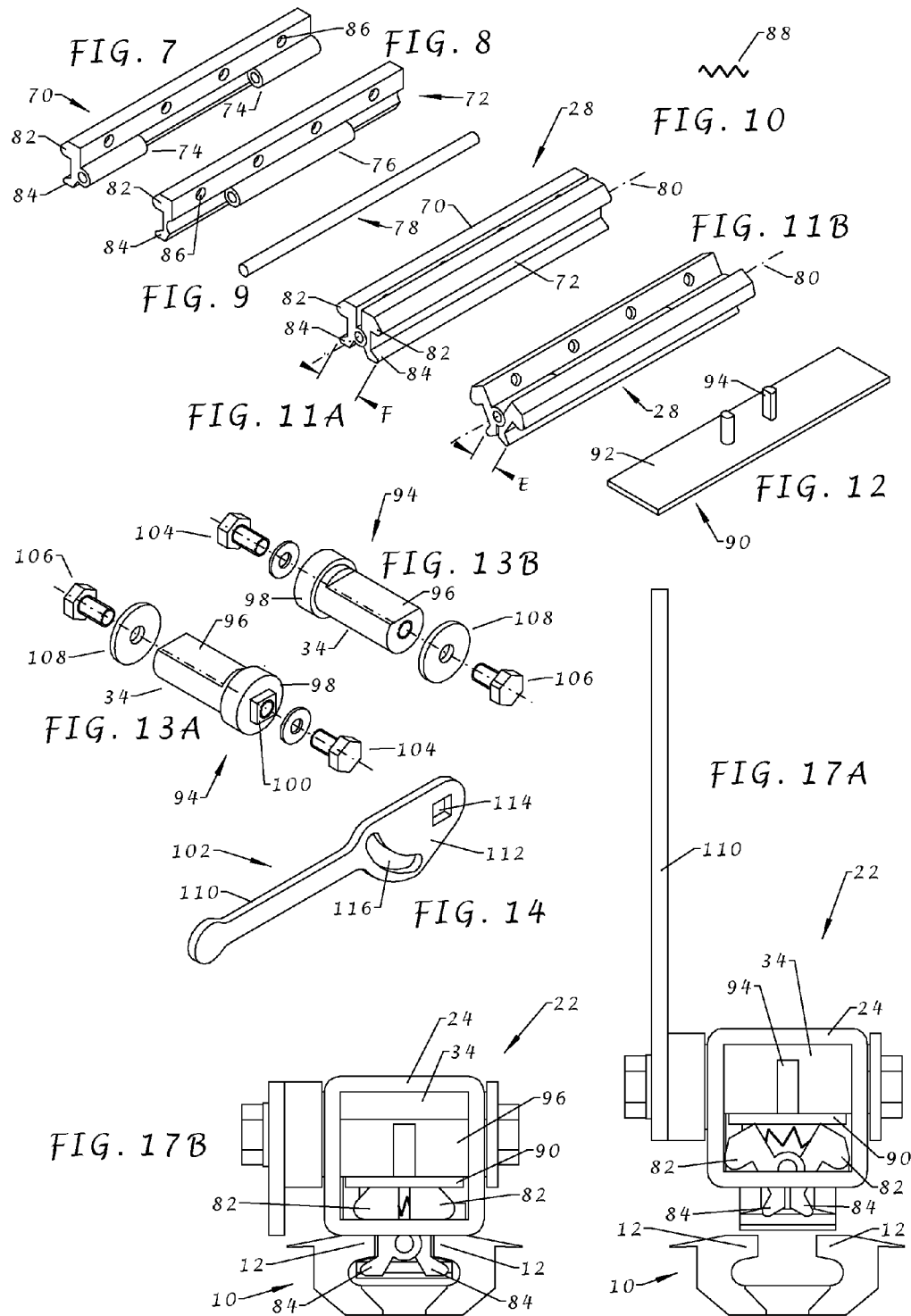

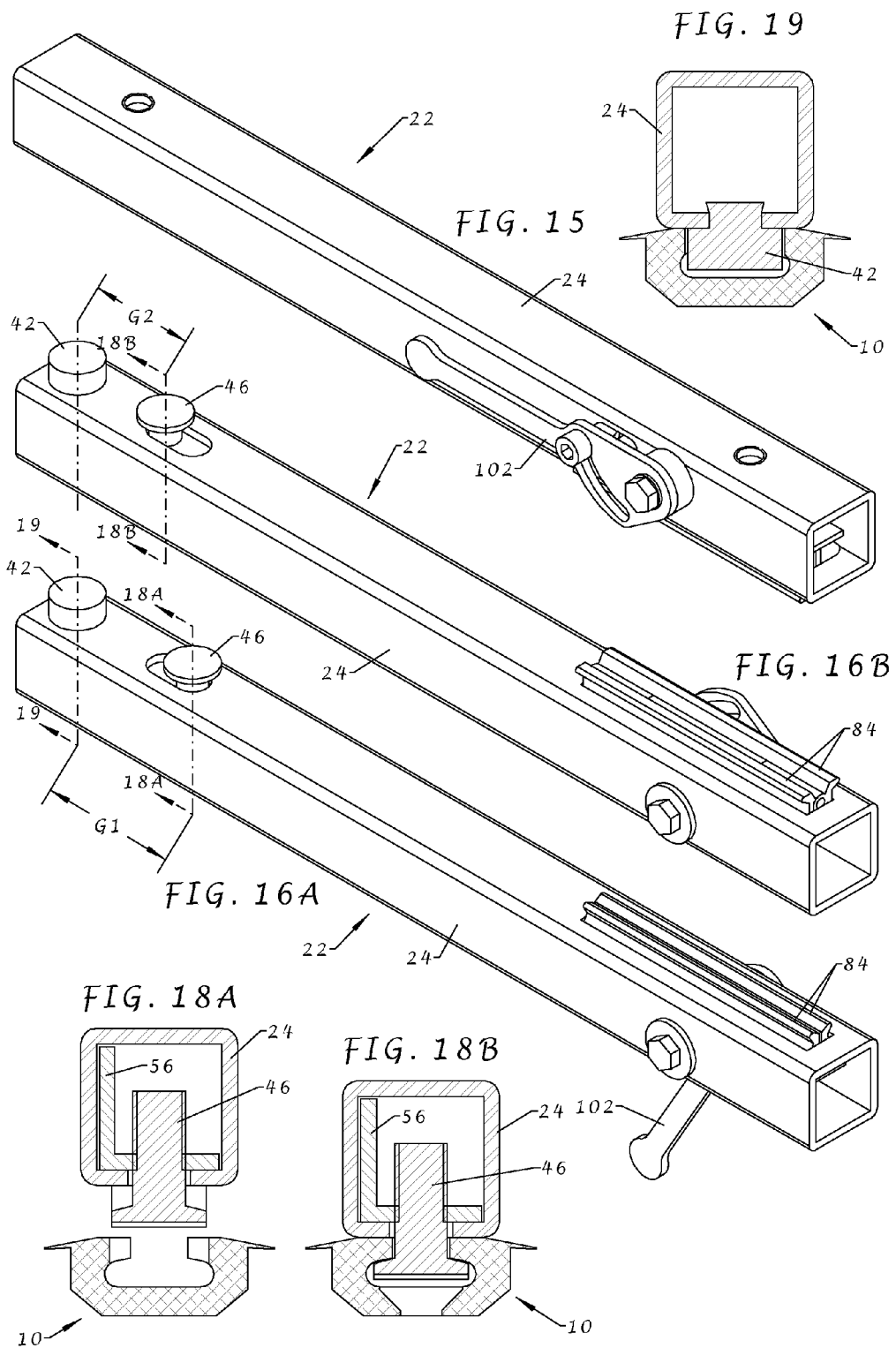

VEHICLE SEAT ANCHORAGES

CROSS REFERENCED TO RELATED APPLICATION

This application claims priority under 35 USC §119 to British Patent Application No. 1208222.8 filed on May 15, 2012, which application is hereby incorporated by reference in its entirety.

TECHNICAL FIELD

This invention relates to a seat anchorage assembly for use with a vehicle floor anchorage rail such as that illustrated in FIG. 1 of the accompanying drawings, which has an upwardly facing channel with a pair of inturned lips between which there is a gap and below which there is a channel.

BACKGROUND OF THE INVENTION

In particular, the anchorage assembly of the present invention seeks to improve on the assembly described in EP 1407920A, in which the assembly comprises an elongate tubular anchorage member for resting on the anchorage rail and a locking mechanism comprising a pair of locking members pivotally connected to each other, the locking members each passing through an aperture in the underside of the anchorage member so that each locking member has an inner portion disposed inside the tubular member and an outer portion below the tubular member. The locking members are movable between an unlocked position, in which the outer portions can pass through the gap in the channel of the floor anchorage rail, and a locked position, when the inner portions are pushed downwardly inside the anchorage member, in which the outer portions engage under the lips of the floor anchorage rail. A cam mechanism is mounted in the anchorage member and is movable between an unlocked position, in which the cam allows the locking members to assume their unlocked positions, and a locked position, in which the cam causes the locking members to assume their locked positions.

Although the anchorage assembly described in EP 1407920A can provide a very strong lock between the seat anchorage member and the floor anchorage rail, the cam mechanism is relatively complicated in construction, expensive and difficult to assemble. The mechanism employs a rotatable cam barrel which causes longitudinal movement of a cam block which in turn, via a number of ramped recesses in the cam block and associated rollers, presses down on the inner portions of the locking elements.

An object of the present invention is to improve on the anchorage assembly described in EP 1407920A.

SUMMARY OF THE INVENTION

According to the present invention there is provided a seat anchorage assembly for use with a vehicle floor anchorage rail having an upwardly facing channel with a pair of inturned lips between which there is a gap and below which the channel is wider internally, the anchorage rail having a series of widened portions in the gap between the inturned lips so that there are narrowed portions between the widened portions;

the seat anchorage assembly comprising:

an elongate tubular anchorage member for resting on the anchorage rail;

a locking mechanism comprising a pair of locking members pivotally connected to each other, the locking members each passing through an aperture in the underside of the anchorage member so that each locking member has an inner portion disposed inside the tubular member and an outer portion below the tubular member, the locking members being movable between:

an unlocked position in which the outer portions can pass through the gap in the channel of the floor anchorage rail, and a locked position, when the inner portions are pushed downwardly inside the anchorage member, in which the outer portions engage under the lips of the floor anchorage rail; and a cam mounted in the anchorage member for rotation about an axis transverse of the anchorage member between:

an unlocked position in which the cam allows the locking members to assume their unlocked positions, and a locked position in which the cam pushes down on the inner portions of the locking members so that they assume their locked positions;

and a locking foot mounted on the anchorage member at a position longitudinally spaced from the locking members for movement longitudinally of the anchorage member, the locking foot having a size such that it can pass through the widened portions of the gap in the anchorage rail, but not the narrowed portions; and a foot-operating mechanism operably connected between the cam and the locking foot so that movement of the cam between its unlocked and locked positions causes movement of the locking foot longitudinally of the anchorage member.

The cam may bear directly on the inner portions of the locking members. However, a simple pressure plate is preferably disposed between a cam surface of the cam and the inner portions of the locking members.

A positioning member is preferably fixed to the anchorage member for insertion into one of the widened portions of the gap in the anchorage rail, the positioning member being such that it cannot enter the narrowed portions of the gap in the anchorage rail.

In the case where the anchorage assembly is for use with an anchorage rail in which the widened portions of the gap have a uniform standard pitch, such as 1 inch (25.4 mm), when the cam is in its unlocked position, the centre-spacing of the locking foot and the positioning member is preferably substantially equal to an integral multiple of the standard pitch, for example 2 inches (50.8 mm), and when the cam is in its locked position, the centre-spacing of the locking foot and the positioning member is preferably substantially different to an integral multiple of the standard pitch, for example 1½ inches (38.1 mm).

The seat anchorage assembly preferably further includes a manually operable handle member operably connected to the cam for moving the cam between its unlocked and locked positions. In this case, the foot-operating mechanism may include a cam follower which cooperates with a second cam provided by the handle member. The invention also extends to such a seat anchorage assembly in combination with vehicle floor anchorage rail.

The invention furthermore extends to a vehicle seat having a pair of such seat anchorage assemblies.

BRIEF DESCRIPTION OF THE DRAWINGS

FIG. 1 is an isometric view of a known floor anchorage rail;

FIGS. 2A and 2B are isometric views of a seat anchorage member;

FIG. 3 is an isometric view of a longitudinal positioning plug for the anchorage member;

FIGS. 4A and 4B are isometric views of a linkage;

FIG. 5 is an isometric view of an operating bolt for the linkage;

FIG. 6 is an isometric view of a locking foot for the linkage;

FIGS. 7 & 8 are isometric views of a pair of hinged locking members;

FIG. 9 is an isometric view of a pivot pin;

FIG. 10 is a schematic view of a spring;

FIGS. 11A and 11B are isometric views of a locking mechanism constructed from the locking members, pivot pin and four of the springs (but with the springs omitted) in a locked position and in an unlocked position, respectively;

FIG. 12 is an isometric view of a pressure plate;

FIGS. 13A and 13B are isometric views of a cam assembly;

FIG. 14 is an isometric view of an actuating lever;

FIG. 15 is an isometric view of a seat anchorage assembly constructed from the parts shown in FIGS. 2 to 14 in its locked position;

FIGS. 16A and 16B are similar to FIG. 15, but with the anchorage assembly upside down and shown in its unlocked position and locked position, respectively;

FIGS. 17A and 17B are end views, on a larger scale, of the anchorage assembly in its unlocked position and locked position, respectively;

FIGS. 18A and 18B are sectioned views through the seat anchorage assembly and the floor anchorage rail, taken on the section lines 18A-18A and 18B-18B (shown in FIGS. 16A and 16B) through the locking foot, respectively; and FIG. 19 is a sectioned view through the seat anchorage assembly and the floor anchorage rail, taken on the section line 19-19 (shown in FIG. 16A) through the positioning plug.

DESCRIPTION OF THE PREFERRED EMBODIMENTS

Referring to FIG. 1 of the drawings, an aluminium anchorage rail 10 of known design is of channel section, open at its top, with a pair of inturned lips 12 so that the width A of the gap 14 between the lips 12 is less than the width B of the channel below the lips 12. The lips 12 are arcuately cut back at regular intervals along the rail 10 to form a series of widened portions 16 of the gap 14 each with a diameter C equal to or slightly less than the width B of the channel below the lips 12. The widened portions 16 have a pitch D of, for example, 1 inch (25.4 mm). The base of the rail 10 is formed with a series of fixing holes 18 (partly obscured in FIG. 1), by which the rail 10 can be fixed to the floor of a vehicle or to some reinforcing member on the floor. The rail 10 also has a pair of out-turned flanges 20 for covering the edges of a floorcovering on the vehicle floor.

An anchorage assembly 22 as shown in FIGS. 15 to 18B comprises the components 25 shown in FIGS. 2 to 14.

Referring in particular to FIGS. 2A and 2B, an anchorage member 24 is formed from a length of steel square-section tube. An elongate rectangular aperture 26 (for receiving a locking assembly 28 as shown in FIGS. 11A and 11B) is formed in the bottom of the member 24 adjacent its front end 30. Opposed holes 32 (for receiving a cam member 34 as shown in FIGS. 13A and 13B) are formed in the sides of the member 24 about half-way along the aperture 26. Behind the hole 32 in one of the sides of the member 24, a slot 36 (for receiving a linkage operating bolt 38 as shown in FIG. 5) is formed in that side of the member 24. A hole 40 (for receiving a positioning plug 42 as shown in FIG. 3) and a slot 44 (for receiving a locking foot 46 as shown in FIG. 6) are formed in the bottom of the member 24 adjacent its rear end 48, with the hole 40 and slot 44 being spaced apart in the longitudinal direction of the anchorage member 24, and with the slot 44 extending in the longitudinal direction. One or more formations 50 are formed on the top of the anchorage member 24 for securing the legs or frame on one side of a vehicle seat to the member 24.

Referring to FIG. 3, the steel positioning plug 42 has a fixing portion 52 which is inserted into the hole 40 in the anchorage member 24 and clinched or burred over to hold it fast, as shown in FIG. 19. A positioning portion 54 of the plug 42 then projects below the anchorage member 24 and is of a shape and size such that it is a snug fit into any of the widened portions 16 of the gap in the anchorage rail 10, but cannot slide from one widened portion 16 to the next.

Referring to FIG. 4A-B, an elongate linkage 56 is formed by a length of steel angle 58 of a size that fits into and can slide in the anchorage member 24. Adjacent one end, a threaded hole 60 (for receiving the locking foot 46 of FIG. 6) is formed in the lower limb of the angle 58. At the other end, an arm 62 projects from the side limb of the angle 58 and is formed with a threaded hole 64 (for receiving the operating screw 38 of FIG. 5). The operating bolt 38 of FIG. 5 may be provided by a standard steel threaded bolt.

Referring to FIG. 6, the steel locking foot 46 has an upper screw-threaded shank 66 for passing through the slot 44 in the anchorage member 24 and screwing into the hole 60 of the linkage 56. The shank 66 is of a diameter less than the width A of the narrow portions of the gap 14 in the anchorage rail 10. At its lower end, the shank 66 has an enlarged portion 68 of a diameter greater than the width A of the narrow portions of the gap 14, but slightly less than the diameter C of the widened portions 16.

Referring now to FIGS. 7 to 11B, the locking mechanism 28 comprises a pair of brass hinged elongate locking members 70 and 72 which are identical apart from having complementary portions 74 and 76, respectively, for containing a steel hinge pin 78 which connects the members 70,72 for hinging movement about a hinge axis 80. Each locking member 70,72 has an upper portion above the hinge axis 80 with an outwardly directed flange 82, and a lower portion beneath the hinge axis 80 with an outwardly directed flange 84. The inner faces of the upper portions are formed with pairs of blind holes 86 to receive the ends of compression coil springs 88 as shown schematically in FIG. 10 (but which are not shown in FIGS. 11A and 11B). The springs 88 serve to urge the upper flanges 82 apart to an unlocked position, as shown in FIG. 11B, in which the width E occupied by the lower flanges 84 is less than the width A of the narrow portions of the gap 14 in the anchorage rail 10. However, the locking mechanism 28 can be forced to assume a locked position, as shown in FIG. 11A, in which the width F occupied by the lower flanges 84 is less than the width A of the narrow portions of the gap 14 in the anchorage rail 10.

A pressure plate 90 as shown in FIG. 12 comprises a strip 92 of steel of a width less than the internal width of the anchorage member 24, and a pair of posts 94 welded or screwed to the strip 92.

Referring to FIGS. 13A-B, the cam assembly 94 comprises the steel cam member 34 which over the majority of its length is cylindrical, except for an elongate flat 96, and of a diameter that fits in the holes 32 in the anchorage member 24. At one end, the cam member 34 has an enlarged cylindrical boss 98 and beyond that a square spigot 100 (to which an operating lever 102 as shown in FIG. 14 is fitted). The cam assembly 94 also comprises a set screw 104, with a washer, that screws into a threaded hole to secure the lever 102 to the cam member 34, and a further set screw 106, with a washer 108, that screws into the other end of the cam member 34. The washer 108 has a larger diameter than the holes 32 in the anchorage member 24 so that the cam assembly 94 can be retained in the anchorage member 24 but is allowed to rotate.

As shown in FIG. 14, the operating lever 102 comprises an arm 110 formed from steel plate with an enlarged portion 112 at one end. A square hole 114 is formed in the enlarged portion 112 to receive the spigot 100 of the cam member 34. The enlarged portion 112 also has a spiral slot 116 having a width slightly larger than the diameter of the operating bolt 38 of FIG. 5. Over an angle of about 45 to 60 degrees centred on the square hole 114, the distance of the slot 116 from the square hole 116 changes by about one half of the pitch D of the widened portions 16 of the gap 14 in the anchorage rail 10.

Referring now to FIGS. 15 to 19, the various components described above are assembled into the anchorage assembly 22 so that the upper flanges 82 of the locking mechanism 28 are disposed inside the anchorage member 24, and the locking mechanism 28 projects through the rectangular aperture 26 in the anchorage member 24 so that the lower flanges 84 of the locking mechanism 28 are disposed outside the anchorage member 24. The pressure plate 90 rests on top of the locking mechanism 28. The cam member 34 passes through the holes 32 in the anchorage member 24 and over the strip 92 of the pressure plate 90 between the posts 94. The cam member 34 is retained by the screw 106 and washer 108. The square hole 114 in the operating lever 102 is fitted to the spigot 100 on the cam member 34, and the operating lever 102 is fixed to the cam member 34 by the screw 104 and its washer. The linkage 56 is disposed in the anchorage member 24 with the hole 64 in its arm 62 adjacent the slot 36 in the anchorage member 24 and with the hole 60 in the linkage 56 adjacent the slot 44 in the anchorage member 24. The shank of the operating bolt 38 passes through the slots 116 and 36 in the operating lever 102 and the anchorage member 24, and the threaded end of the bolt 38 is screwed into the hole 64 in the linkage 56. The shank of the locking foot 46 passes through the slot 44 in the anchorage member 24, and its threaded end is screwed into the hole 60 in the linkage 56. The positioning plug 42 is fitted to the anchorage member 24 as described above.

The anchorage assemblies 22 would normally be employed in pairs, with one anchorage assembly 22 being secured to the right-hand side of the base frame of a vehicle seat, and the other anchorage assembly 22 being secured to the left-hand side of the base frame, so that the spacing of the anchorage assemblies 22 is substantially identical to the spacing of a pair of the anchorage rails 10 on the floor of the vehicle to which the seat is to be fitted. The two anchorage assemblies 22 would preferably be mirror images of each other so that the two operating handles are equally accessible. To facilitate this, a slot may be formed in the opposite side wall of the anchorage member 24, similar to the slot 36, so that the anchorage member is not handed. The linkage 56 would, however, need to be handed for the right of left anchorage assembly 22.

The anchorage assembly is movable between an unlocked state, as shown in FIGS. 16A and 17A, and a locked state, as shown in FIGS. 16, 16B and 17B. In the unlocked state of FIGS. 16A and 17A, the arm 110 of the operating lever 102 is inclined upwardly, and the flat 96 on the cam member 34 is horizontal underneath the cam member 34. This permits the upper flanges 82 of the locking members 70,72 to be forced apart by the springs 88, and the lower flanges 84 of the locking members 70,72 to be near each other, as shown in particular in FIG. 17A, so that the lower flanges 84 can be inserted through the gap 14 in the anchorage rail 10. The linkage 56 and the spiral slot 116 in the operating lever 102 are arranged so that, when the operating lever 102 is in this position, the centre spacing G1 (see FIG. 16A) between the positioning plug 42 and the locking foot 46 is an integral multiple of the pitch D (see FIG. 1) of the widened portions 16 of the gap 14 in the anchorage rail 10. The plug 42 and the enlarged portion 68 of the locking foot 46 can therefore also be inserted through the gap 14 in the anchorage rail 10.

In order to change from the unlocked state to the locked state, the arm 110 of the operating lever 102 is manually pushed downwardly so that it becomes aligned alongside the anchorage member 24. This action rotates the cam member 34 so that the cam member 34 presses the pressure plate 90 downwardly, which in turn causes the upper flanges 82 of the locking members 70 and 72 to pivot towards each other, and the lower flanges 84 of the locking members 70 and 72 to pivot away from each other, to the locked position as shown in FIG. 17B. The lower flanges of the locking member 70 and 72 engage underneath the adjacent lip portions 12 of the anchorage rail 10 so as to lock the anchorage member 24 to the anchorage rail 10.

Furthermore, this movement of the operating lever 102, through the action of the spiral slot 116 and the operating bolt 38, causes the linkage 56 to move by a distance approximately equal to one half of the pitch D of the widened portions 16 of the gap 14 in the anchorage rail 10, so that the centre spacing G2 (see FIG. 16B) between the positioning plug 42 and the locking foot 46 is about half a pitch D different from an integer multiple of the pitch D. As a result, the enlarged portion 68 of the locking foot 46 becomes engaged underneath the adjacent lip portions 12 of the anchorage rail 10 also so as to lock the anchorage member 24 to the anchorage rail 10. When the anchorage member 24 is locked to the anchorage rail 10 in this manner, the positioning plug 42 serves to prevent the anchorage member 24 from sliding along the anchorage rail 10. Provided that the part-cylindrical portion of the cam member 34 rides onto the pressure plate 90 when the assembly 22 is in the locked position, the assembly 22 will remain in the locked position due to friction between the various components.

In order to change from the locked state to the unlocked state, the arm 110 of the operating lever 102 is manually lifted, and the components of the anchorage assembly 22 revert to their originally described positions so that the anchorage assembly 22 can be removed from the anchorage rail 10.

Various modifications and developments may be made to the anchorage assembly described above.

For example, a catch may be provided to lock the operating lever 102 positively in its locked position to reduce the risk of the lever 102 inadvertently being moved to its unlocked position. The catch may be spring-loaded, or it may be provided by a stop which falls under the influence of gravity to a position where it blocks movement of the lever 102 from its locked position, but which can be raised manually to allow the lever 102 to be moved.

Also, a resilient crinkle washer may be provided on the shank 66 of the locking foot 46 between the linkage 56 and the lower portion of the anchorage member 24 so as to prevent rattling.

Furthermore, two of the anchorage assemblies on the same seat may have their cam members 34 interconnected and operated by a single operating lever 102.

What is claimed is:
1. A seat anchorage assembly for use with a vehicle floor anchorage rail having an upwardly facing channel with a pair of inturned lips between which there is a gap and below which the channel is wider internally, the anchorage rail having a series of widened portions in the gap between the inturned lips so that there are narrowed portions between the widened portions;

the seat anchorage assembly comprising:

an elongate tubular anchorage member for resting on the anchorage rail;

a locking mechanism comprising a pair of locking members pivotally connected to each other, the locking members each passing through an aperture in the underside of the anchorage member so that each locking member has an inner portion disposed inside the tubular member and an outer portion below the tubular member, the locking members being movable between:

an unlocked position in which the outer portions can pass through the gap in the channel of the floor anchorage rail, and a locked position, when the inner portions are pushed downwardly inside the anchorage member, in which the outer portions engage under the lips of the floor anchorage rail; and a cam mounted in the anchorage member for rotation about an axis transverse of the anchorage member between:

an unlocked position in which the cam allows the locking members to assume their unlocked positions, and a locked position in which the cam pushes down on the inner portions of the locking members so that they assume their locked positions;

and a locking foot mounted on the anchorage member at a position longitudinally spaced from the locking members for movement longitudinally of the anchorage member, the locking foot having a size such that it can pass through the widened portions of the gap in the anchorage rail, but not the narrowed portions; and a foot-operating mechanism operably connected between the cam and the locking foot so that movement of the cam between its unlocked and locked positions causes movement of the locking foot longitudinally of the anchorage member.

2. The seat anchorage assembly as claimed in claim 1, further including:

a pressure plate disposed between a cam surface of the cam and the inner portions of the locking members.

3. The seat anchorage assembly as claimed in claim 1, further including:

a positioning member fixed to the anchorage member for insertion into one of the widened portions of the gap in the anchorage rail, the positioning member being such that it cannot enter the narrowed portions of the gap in the anchorage rail.

4. The seat anchorage assembly as claimed in claim 3 and for use with an anchorage rail in which the widened portions of the gap have a uniform standard pitch, wherein:

when the cam is in its unlocked position, the centre-spacing of the locking foot and the positioning member is substantially equal to an integral multiple of the standard pitch;

and when the cam is in its locked position, the centre-spacing of the locking foot and the positioning member is substantially different from an integral multiple of the standard pitch.

5. The seat anchorage assembly as claimed in claim 3, further including:

a manually operable handle member operably connected to the cam for moving the cam between its unlocked and locked positions.

6. The seat anchorage assembly as claimed in claim 5, wherein:

the foot-operating mechanism includes a cam follower which cooperates with a second cam provided by the handle member.

7. The seat anchorage assembly as claimed in claim 1, further including:

a manually operable handle member operably connected to the cam for moving the cam between its unlocked and locked positions.

8. The seat anchorage assembly as claimed in claim 2, further including:

a manually operable handle member operably connected to the cam for moving the cam between its unlocked and locked positions.

9. The seat anchorage assembly as claimed in claim 4, further including:

a manually operable handle member operably connected to the cam for moving the cam between its unlocked and locked positions.

10. A vehicle seat having a pair of seat anchorage assemblies as claimed in claim 1.

* * * * *